United States Patent
Grieve et al.

(10) Patent No.: US 9,703,761 B2
(45) Date of Patent: Jul. 11, 2017

(54) DELAYED CODE PARSING FOR REDUCED STARTUP LATENCY

(71) Applicant: Google Inc., Mountain View, CA (US)

(72) Inventors: Andrew Grieve, Waterloo (CA); Bikin Chiu, Mississauga (CA)

(73) Assignee: Google Inc., Mountain View, CA (US)

( * ) Notice: Subject to any disclaimer, the term of this patent is extended or adjusted under 35 U.S.C. 154(b) by 988 days.

(21) Appl. No.: 13/890,830

(22) Filed: May 9, 2013

(65) Prior Publication Data

US 2015/0193397 A1  Jul. 9, 2015

Related U.S. Application Data

(63) Continuation of application No. 13/249,694, filed on Sep. 30, 2011, now Pat. No. 8,458,585, which is a continuation of application No. 12/782,830, filed on May 19, 2010, now Pat. No. 8,453,049.

(51) Int. Cl.
*G06F 17/22* (2006.01)
*G06F 9/455* (2006.01)
*G06F 17/30* (2006.01)

(52) U.S. Cl.
CPC ...... *G06F 17/2247* (2013.01); *G06F 9/45529* (2013.01); *G06F 17/30902* (2013.01)

(58) Field of Classification Search
CPC ........... G06F 17/2247; G06F 17/30902; G06F 9/45529; H04L 29/0604; H04L 29/0617; H04L 29/0651; H04L 29/0653
See application file for complete search history.

(56) References Cited

U.S. PATENT DOCUMENTS

| | | | |
|---|---|---|---|
| 6,011,537 A * | 1/2000 | Slotznick | G06F 3/14 707/E17.119 |
| 6,061,698 A | 5/2000 | Chadha et al. | |
| 6,351,536 B1 | 2/2002 | Sasaki | |
| 6,453,327 B1 | 9/2002 | Nielsen | |
| 6,507,857 B1 * | 1/2003 | Yalcinalp | G06F 9/4443 707/E17.006 |
| 6,725,424 B1 | 4/2004 | Schwerdtfeger et al. | |
| 7,152,203 B2 | 12/2006 | Gao et al. | |
| 7,207,000 B1 * | 4/2007 | Shen | G06F 17/2247 707/999.01 |
| 7,240,279 B1 | 7/2007 | Chartier et al. | |
| 7,340,499 B1 | 3/2008 | Casella | |
| 7,437,442 B2 | 10/2008 | Ashiya | |
| 7,461,339 B2 | 12/2008 | Liao et al. | |

(Continued)

OTHER PUBLICATIONS

Ajile 1.2.1., [retrieved on Mar. 23, 2010]. Retrieved from the Internet: http://ajile.netidocs/Ajile-Overview.htm, 3 pages.

(Continued)

*Primary Examiner* — Thu Huynh
(74) *Attorney, Agent, or Firm* — Fish & Richardson P.C.

(57) ABSTRACT

Methods, systems, and apparatus, including computer programs encoded on a computer storage medium, for delaying code parsing. In one aspect, a method includes receiving a resource that includes markup language code and executable code embedded within the markup language code, invoking the markup language code without parsing the executable code, extracting the executable code from within the markup language code, and invoking the executable code.

20 Claims, 4 Drawing Sheets

(56) References Cited

U.S. PATENT DOCUMENTS

| | | | |
|---|---|---|---|
| 7,574,692 B2 | 8/2009 | Herscu | |
| 7,735,001 B2 | 6/2010 | Kamiya | |
| RE41,440 E | 7/2010 | Briscoe et al. | |
| 7,814,410 B2 | 10/2010 | Kothari et al. | |
| 8,903,941 B1* | 12/2014 | Kaul | G06F 21/54 709/203 |
| 2002/0035579 A1* | 3/2002 | Wang | G06F 17/30905 715/234 |
| 2002/0147772 A1 | 10/2002 | Glommen et al. | |
| 2002/0174146 A1* | 11/2002 | Dang | G06F 17/211 715/234 |
| 2003/0121000 A1* | 6/2003 | Cooper | G06F 8/51 715/234 |
| 2003/0233620 A1* | 12/2003 | Vedullapalli | G06F 17/211 715/209 |
| 2004/0113908 A1 | 6/2004 | Galanes et al. | |
| 2004/0135589 A1 | 7/2004 | Matuschek et al. | |
| 2005/0198300 A1 | 9/2005 | Gong et al. | |
| 2006/0155780 A1 | 7/2006 | Sakairi et al. | |
| 2006/0190561 A1 | 8/2006 | Conboy et al. | |
| 2007/0156871 A1* | 7/2007 | Braun | G06F 21/6209 709/223 |
| 2007/0169011 A1 | 7/2007 | Ramani et al. | |
| 2008/0046254 A1 | 2/2008 | Nuno et al. | |
| 2008/0104025 A1 | 5/2008 | Dharamshi et al. | |
| 2008/0178162 A1 | 7/2008 | Sanford et al. | |
| 2008/0235671 A1 | 9/2008 | Kellogg et al. | |
| 2008/0301460 A1 | 12/2008 | Miller et al. | |
| 2009/0100154 A1 | 4/2009 | Stevenson et al. | |
| 2009/0225039 A1 | 9/2009 | Williamson et al. | |
| 2009/0260087 A1 | 10/2009 | Ishida et al. | |
| 2009/0276488 A1* | 11/2009 | Alstad | H04L 67/303 709/203 |
| 2010/0017464 A1 | 1/2010 | Cheng et al. | |
| 2010/0057843 A1 | 3/2010 | Landsman et al. | |
| 2010/0131951 A1 | 5/2010 | Carteri et al. | |
| 2010/0223322 A1* | 9/2010 | Mott | G06F 17/30905 709/203 |
| 2010/0235726 A1 | 9/2010 | Ording et al. | |
| 2011/0015917 A1 | 1/2011 | Wang et al. | |
| 2011/0028999 A1 | 2/2011 | Chu | |
| 2011/0029899 A1 | 2/2011 | Fainberg et al. | |
| 2011/0119352 A1 | 5/2011 | Perov et al. | |
| 2011/0267653 A1 | 11/2011 | Yamamoto | |

OTHER PUBLICATIONS

Developer's Guide—Code Splitting, [retrieved on Mar. 23, 2010]. Retrieved from the Internet: http://code.google.com/webtoolkitidoc/latestlDevGuideCodeSplitting.html, 11 pages.

Office Action for U.S. Appl. No. 13/249,419 dated Apr. 4, 2012. 13 pages.

Office Action for U.S. Appl. No. 13/249,419 dated Dec. 9, 2011. 9 pages.

Office Action for U.S. Appl. No. 12/730,697 dated Dec. 9, 2011. 7 pages.

Notice of Allowance for U.S. Appl. No. 13/249,419 dated Jun. 8, 2012, 7 pages.

Google Code Blog: Gmail for Mobile HTML5 Series—Reducing Startup Latency, dated Sep. 3, 2009, [retrieved 1 on May 19, 2010]. Retrieved from the Internet: http://googlecode.blogspot.com/2009/09/gmail-for-mobile-html5-series-reducing.html, 4 pages.

Office Action issued in U.S. Appl. No. 12/782,830 dated Dec. 22, 2011, 20 pages.

Office Action issued in U.S. Appl. No. 12/782,830 dated Jun. 13, 2012, 19 pages.

Office Action issued in U.S. Appl. No. 13/249,694 dated Nov. 29, 2011, 22 pages.

Office Action issued in U.S. Appl. No. 13/249,694 dated Apr. 4, 2012, 20 pages.

Office Action issued in U.S. Appl. No. 13/249,694 dated Jun. 28, 2012, 17 pages.

Office Action issued in U.S. Appl. No. 12/782,830 dated Oct. 5, 2012, 12 pages.

Office Action issued in U.S. Appl. No. 13/249,694 dated Oct. 15, 2012, 13 pages.

Notice of Allowance issued in U.S. Appl. No. 12/782,830 dated Feb. 1, 2013, 13 pages.

Notice of Allowance issued in U.S. Appl. No. 13/249,694, dated Feb. 4, 2013, 13 pages.

Notice of Allowance issued in U.S. Appl. No. 12/730,697 on Aug. 31, 2012, 19 pages.

Notice of Allowance issued in U.S. Appl. No. 12/730,697 on Dec. 10, 2012, 14 pages.

* cited by examiner

DELAYED CODE PARSING FOR REDUCED STARTUP LATENCY

CROSS-REFERENCE TO RELATED APPLICATIONS

This application is a continuation of U.S. patent application Ser. No. 13/249,694, filed Sep. 30, 2011, which is a continuation of U.S. patent application Ser. No. 12/782,830, filed on May 19, 2010, the contents of which are incorporated by reference.

BACKGROUND

This specification generally relates to code modularization, and particularly to delaying the parsing of computer code in order to reduce web page startup latency.

Startup latency is a critical measure of a web application's performance. As more and more features are added to a web application, the amount of JavaScript code that is used to implement these features may dramatically increase, making it difficult to achieve a desirable, short startup time. If a web application loads too slowly, a user may not even bother to wait for it to fully load before navigating away.

SUMMARY

In general, one innovative aspect of the subject matter described in this specification may be embodied in methods that include the actions of embedding non-essential code (e.g., JavaScript code or modules) in a portion of the code of a resource (e.g., a web page) that is not parsed, such as a portion that is typically reserved for comments. During the initial loading of a web application, the non-essential code is stored in random access memory (RAM) or the browser cache, and is synchronously extracted, parsed and dynamically evaluated on demand. By delaying the parsing and evaluation of the non-essential code until some time after the web application is initially loaded, startup latency may be reduced.

As used by this specification, "core," or "essential" code refers to code that a server infers should be loaded when the resource is initially loaded, and "non-essential" code refers to code that a server infers may be dynamically loaded after the resource is initially loaded (e.g., upon the occurrence of an event such as a button click event, mouse event, a change in device state, or after a predetermined amount of time has elapsed). The classification of certain code as "essential" or "non-essential" may occur on a per-user basis, for example based on historical usage patterns of a particular user, or it may occur based on determining that an initial load is or is not possible or desirable without also loading the code.

Furthermore, as used by this specification, a "web application" is an application that is accessed over a network, or a computer software application that is hosted in a browser-controlled environment or coded in a browser-supported language and that is reliant on a web browser to render the application executable. Example web applications include web mail applications, online retail sales applications, online auction applications, and 'wiki' applications. "Dynamic loading" or "dynamic evaluation" refers to a process by which an application can, at runtime, load a resource (e.g., a file, code or a code portion, a module, library, or binary) into memory, retrieve and parse the addresses of functions and variables that are referenced by the resource, evaluate or execute those functions or access those variables, and unload the resource from memory.

In general, another innovative aspect of the subject matter described in this specification may be embodied in methods that include the actions of receiving a resource that includes markup language code and executable code embedded within the markup language code, invoking the markup language code without parsing the executable code, extracting the executable code from within the markup language code, and invoking the executable code.

Other embodiments of these aspects include corresponding systems, apparatus, and computer programs, configured to perform the actions of the methods, encoded on computer storage devices.

These and other embodiments may each optionally include one or more of the following features. For instance, the markup language code includes HyperText Markup Language (HTML) code; the executable code includes JavaScript; the actions further include determining that a Document Object Model (DOM) event has occurred, and extracting the executable code further includes extracting the executable code based on determining that the DOM event has occurred; determining that a DOM event has occurred further includes determining than an onclick event handler has been invoked; receiving a resource that includes markup language code and executable code embedded within the markup language code further includes receiving a single resource that includes both markup language code and executable code embedded within the markup language code; the executable code is embedded within a <SCRIPT> tag, a <STYLE> tag, or a CDATA section; the executable code is embedded within a <NOSCRIPT> tag; extracting the executable code further includes selecting a portion of a comment between a begin-comment delimiter and an end-comment delimiter, and replacing one or more occurrences of a predefined token within the portion of the comment, with the end-comment delimiter; and/or receiving a resource that includes markup language code and executable code embedded within the markup language code further includes receiving a resource that includes markup language code and executable code embedded within a comment in the markup language code, and extracting the executable code from within the markup language code further includes extracting the executable code from within the comment in the markup language code.

The details of one or more embodiments of the subject matter described in this specification are set forth in the accompanying drawings and the description, below. Other features, aspects and advantages of the subject matter will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
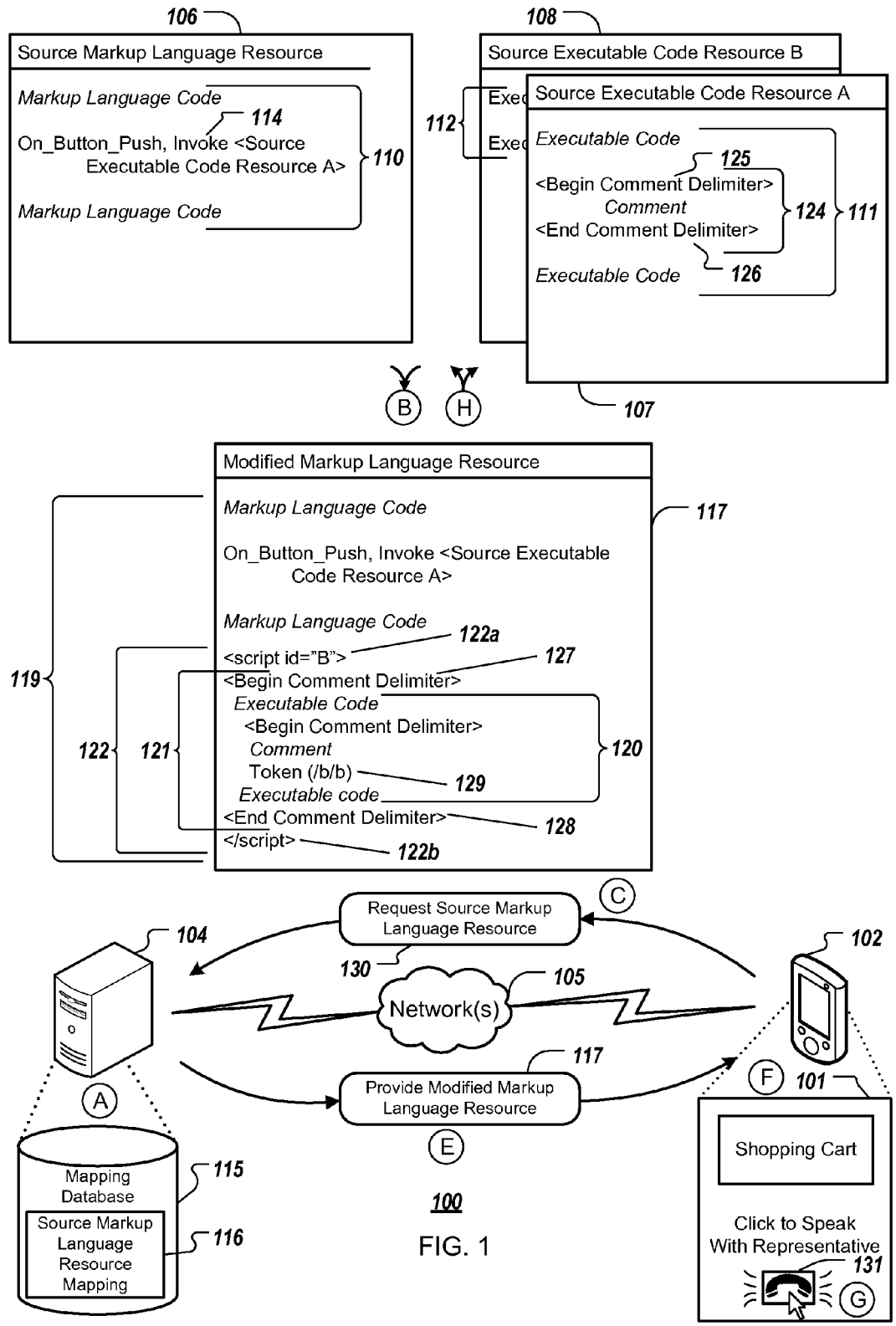
FIGS. 1 and 4 show example systems that delay the parsing of non-essential code to reduce startup latency.

FIG. 1 illustrates an example system 100 that delays the parsing of non-essential code to reduce startup latency. FIG. 1 also illustrates a flow of data within the system 100 during states (A) to (H), as well as a user interface 101 that is displayed on a client device 102 of the system 100 during various states, including states (F) and (G). The states (A) to (H) may occur in the illustrated sequence, or they may occur in a sequence that is different than the illustrated sequence.

In one example implementation, the system 100 embeds non-essential code in a portion of the code of a resource that is not initially parsed, for example a portion that is typically reserved for comments (e.g., by "commenting out" the non-essential code). During the initial load of a web application, the non-essential code is stored in RAM or the browser cache but is not parsed, and is synchronously extracted (or "decommented"), parsed and dynamically evaluated, on demand, at a time after the initial load.

The example system 100 includes a mobile client communication device ("client device") 102 and a server 104 (e.g., a web server, a mail server or a search engine), connected by way of one or more networks 105. The client device 102 may be, for example, a laptop computer, desktop computer, mobile phone, Personal Digital Assistant (PDA), smart phone, tablet computer, music player, e-book reader, or a handheld or mobile device. The networks 105 may include a wireless cellular network, a wireless local area network (WLAN) or WiFi network, a Third Generation (3G) or Fourth Generation (4G) mobile telecommunications network, a private network such as an intranet, a public network such as the Internet, or any appropriate combination thereof.

The server 104 hosts or otherwise has access to a source markup language resource 106 and source executable code resources 107 and 108 that are associated with a web application. For example, if the web application is a retail web application, the source markup language resource 106 may be a markup language document that includes markup language code 110 (e.g., HyperText Markup Language (HTML) code, eXtensible Markup Language (XML) code, or eXtensible HTML (XHTML) code) that, when invoked by the client device 102, displays a shopping cart on the user interlace 101.

The source executable code resources 107 and 108 may include executable code 111 and 112 (e.g., JavaScript code), respectively, that is referenced by the source markup language resource 106. One or both of the source executable code resources 107 and 108 may be modules of executable code that are internal to the source markup language resource 106.

The source executable code resources 107 and 108 may each implement features of the retail web application. For instance, a portion 114 of the markup language code 110 may reference the executable code 111, to implement a "speak with representative" feature associated with the retail web application. The markup language code 110 may call the executable code 111 upon the occurrence of an event, such as an "on button push" input device event or a mouse event.

The server 104 also hosts a mapping database 115 that stores mappings for different resources, such as a mapping 116 that is associated with the source markup language resource 106. The one or more mappings that are associated with each resource identify one or more portions of the resource which represent (e.g., which include or which reference) essential code, and/or one or more portions of the resource which represent non-essential code. For a particular resource, the mapping database 115 may include different mappings for different users or clusters of users, or may include different mappings for the resource that are segmented by other criteria, such as by time, date, location or locale, motion, or other context.

In general, according to the example process illustrated in FIG. 1, the client device 102 requests a resource (i.e., the source markup language resource 106), receives a modified markup language resource 117 that includes markup language code 119 and executable code (i.e., a modified version 120 of executable code 111) embedded as a comment 121 within the markup language code 119, and stores the modified markup language resource 117 in a local browser cache or as the active page in RAM. After the markup language code 119 is invoked, the client device 102 extracts the modified version 120 of the executable code 111 from the comment 121 within the markup language code 119, generates the executable code 111 from the modified version 120 of the executable code 111, and invokes the executable code 111.

By delaying the parsing and evaluation of the executable code 111 (or the modified version 120 of the executable code 111) until some time after the modified markup language resource 117 is initially loaded, startup latency may be reduced. Other latencies may be reduced by accessing the executable code 111 from the browser cache of the client device, instead of over a network connection.

In more detail, during state (A), the server 104 selects the mapping 116 that is associated with the source markup language resource 106, to identify essential and/or non-essential code that is referenced by the source markup language resource 106. The mapping 116 may indicate that the executable code 111 is non-essential, and that the executable code 111 is essential. For example, the executable code 111 may implement a feature that the user of the mobile device 102 typically does not use until a long time after the web application is initially loaded, while the executable code 112 may include code that is required for the web application to load, or that implements a feature of the web application that the user of the mobile device always or almost always uses in a context (e.g., the context of 'driving in a car,' or 'daytime') that matches the user's current context.

When a resource is associated with more than one mapping, criteria such as time, date, context, location or locale information, user identifier or cluster, or mobile device identifier or cluster may be used to disambiguate or select one of the mappings to use to identify essential and non-essential code. In implementations where no mapping is used, a user may manually identify essential or non-essential code, for example in response to prompting.

During state (B), the server 104 may generate a modified version 120 of the executable code 111, and may embed or comment out the modified version 120 (or the executable code 111 itself) within the comment 121 of the markup language code 119 of the modified markup language resource 117. The modified version 120 of the executable code 111 may be written into the markup language code 119 by appending the comment 121 (as bounded by a BEGIN COMMENT delimiter 127 and a corresponding END COMMENT delimiter 128) and an associated <SCRIPT> tag 122 (as bounded by a BEGIN <SCRIPT> tag 122a and a corresponding END <SCRIPT> tag 122b) to the markup language code 110. The modified version 120 of the executable code 111 may then be written or embedded inside the comment 121, or in another portion of the markup language code 119.

Instead of using a <SCRIPT> tag 122, the modified version 120 of the executable code 111 may be embedded in a CDATA section (e.g., if the markup language code 110 includes XHTML code). Alternatively, the modified version 120 of the executable code 111 may be embedded into the markup language code 119 using other tags or approaches, such as by embedding the modified version 120 of the executable code 111 using a <NOSCRIPT> tag, a <STYLE> tag, or an XML comment ("<!-- . . . -->").

The server 104 may or may not modify the executable code 111, to generate the modified version 120 of the executable code 111, before it is written into the comment 121. One such circumstance where modification may be appropriate occurs when the executable code 111 includes a token that represents an END COMMENT delimiter, as defined by the markup language of the source markup language resource 106. In various markup languages, the tokens "//", "*/", "!", "-->", "--", and "end" may represent END COMMENT delimiters.

When the executable code 111 includes a token that represents and END COMMENT delimiter, copying the executable code 111 (including the END COMMENT delimiter) into the modified markup language resource 117 may result in an error when the markup language code 119 is invoked. Specifically, when performing a decommenting operation to extract the executable code 111 from the comment 121, the server 104 might select less than all of the executable code 111. As such, the executable code 111 may be modified by replacing END COMMENT delimiters, as defined by the markup language of the source markup language resource 106, with an arbitrary token that will not be interpreted by the server 104 as an END COMMENT delimiter.

In the example illustrated in FIG. 1, the executable code 111 includes a comment 124 that is bounded by a BEGIN COMMENT delimiter 125 ("<BEGIN COMMENT Delimiter>") and an END COMMENT delimiter 126 ("<END COMMENT Delimiter>"). For JavaScript code, the BEGIN COMMENT delimiter 125 may be "/*", and the END COMMENT delimiter 126 may be "*/".

To ensure that the END COMMENT delimiter 126 is matched with the BEGIN COMMENT delimiter 125 when the executable code 111 is embedded within the comment 121, the comment 124 may be removed or processed before it is embedded within the comment 121. Processing the comment 124 may prevent the END COMMENT delimiter 126 from being matched with the BEGIN COMMENT delimiter 127 of the comment 121 instead of the BEGIN COMMENT delimiter 125 of the comment 124. Similarly, processing the comment 124 cause the END COMMENT delimiter 128 to be properly matched with the BEGIN COMMENT delimiter 127 of the comment 121 instead of the BEGIN COMMENT delimiter 125 of the comment 124.

In some implementations, the comment 124 is removed before the executable code 111 is inserted into the markup language 119. In other implementations, END COMMENT delimiters included in executable code 111 are replaced with an arbitrary token 129 of one or more characters which would otherwise not normally appear in executable code or markup language code. One such token is the string "\b\b", which is a series of characters would otherwise not normally appear in HTML, XML, or JavaScript code. In the example illustrated in FIG. 1, the END COMMENT delimiter 126 of executable code 111 has been replaced by the token 129 before the modified version 120 of the executable code 111 is embedded into the comment 121 of the markup language code 119. In other implementations, the executable code 111 is not modified before it is inserted into the comment 121. A reverse of this operation is performed before the executable code is executed (e.g., by changing the "\b\b" token back to a "*/").

During state (C), the user of the client device 102 enters a command into the client device 102 to invoke the web application associated with the resource 106. For example, the user may enter a command into a web browser to invoke a retail web application. The client device 102 communicates a request 130 to the server 104 to request the resource 106. The request 120 may also include other information, such as data that uniquely identifies the user of the client device 102 or that uniquely identifies the client device 102 itself, or the request 120 may include data that describes a context associated with the user or the client device 102.

In response to the request for the source resource 106, the server 104 identifies that the modified markup language 117 corresponds to the source markup language resource 106 and, during state (E), communicates a copy of the modified markup language resource 117 to the client device 102. The modified markup language resource 117 may be generated or identified before or after the request for the source resource 106 is communicated (i.e., during step (C)) by the client device 102. The copy of the modified markup language resource 117 may be stored in a browser cache or other memory on the client device 102.

During state (F), the client device 102 invokes at least a portion of the markup language code 119 included in the resource 117. For example, invoking the markup language code 119 included in the resource 117 may include loading, executing, running, calling, parsing, and/or evaluating the markup language code 119, resulting in the user interface 101 for the retail web application being displayed on the client device 102. When the markup language code 119 is initially loaded and invoked, the modified version 120 of the executable code 111 is not parsed or evaluated since it is commented out. The markup language code 119 may be invoked by a web browser on the client device 102.

Invoking the markup language code 119 may also include registering event handlers for any non-essential code that is embedded within the comments of the markup language code 119. For example, the markup language code 119 may be parsed to identify the non-essential code and the corresponding events that cause the non-essential code to be called, and event handlers may be registered to extract the non-essential code from the comments and evaluate the non-essential code upon the occurrence of the event. Among several actions that may be performed based upon the occurrence of an event, an event handler may re-write or re-route an external request for the non-essential code (e.g., a request to access the non-essential code over the networks 105) as an internal request for the non-essential code (e.g., a request to access the non-essential code from the browser cache of the client device 102).

During state (G), an event hander detects that a control 131 has been selected on the user interface 101. The event handler may be associated with an event described by the portion 114 of the markup language code 110. In this example, the event handler is associated with an "on button push" event, although other event handlers, such as DOM event handlers or timer event handlers may also be used. Because, in an effort to minimize startup latency, the executable code 111 associated with the control 131 has not yet been parsed or evaluated, it may be dynamically evaluated at this time.

The event handler may issue a request to access the code referenced by the portion 114 of the markup language code, specifically the executable code 111 of the source executable code resource 107. The request may be an external request to obtain the source executable code resource 107 from a location or address that is external to the client device 102 (e.g., over the networks 105). In this scenario, an application executing on the client device 102 may intercept this external request, and may instead trigger a process to obtain the modified markup language resource 117 from the browser cache of the mobile device 120, decomment the executable code 111 (or, more specifically, the modified version 120 of the executable code 111) from the comment 121, and evaluate the executable code 111 on demand. Since the executable code 111 has already been downloaded by the client device 102, albeit in modified form, an additional access of the networks 105 is not required, further reducing load times.

In an alternative example, the event handler may issue an internal request to obtain the modified markup language resource 117 directly from the browser cache of the mobile device 120, decomment the executable code 111 (or, more specifically, the modified version 120 of the executable code 111) from the comment 121, and evaluate the executable code 111. Although the event handler may require modification in order to infer or direct that the external request be re-routed as an internal request, such modification avoids the necessity of an additional application that would otherwise be required to re-route external requests. A reduction in load times may also be perceived by the user of the mobile device 102.

During state (H), the modified version 120 of the executable code 111 is extracted or decommented from the comment 121, and the executable code 111 is generated from the modified version 120. The executable code 111 may be generated from the modified version 120 by replacing the arbitrary token 129 with an appropriate END COMMENT delimiter 126, as defined by the language of the executable code 111 of the resource 107. For example, each occurrence of the arbitrary token 129 in the modified version 120 of the executable code may be replaced by an END COMMENT delimiter 126 (e.g., "*/"). In implementations where a <SCRIPT> tag 122 is used to embed the executable code 111, a DOM element for the <SCRIPT> tag which includes the executable code 111 may be located (e.g., by querying the DOM for a script element having a particular "id" attribute).

The executable code 111 is invoked, for example using loading, executing, running, calling, parsing, and/or evaluating operations. Invocation of the executable code 111 may occur using the same operation or a different operation than was used, during state (F), to invoke the markup language code 119. In one example, the executable code 111 is invoked using an EVAL( ) function. In the example of FIG. 1, the invocation of the executable code 111 results in the launching of the "speak with representative" feature of the retail web application that was selected by the user of the mobile device 101 during state (G).

Using the example process illustrated in FIG. 1, startup latency of a web application is reduced, since the parsing of the executable code 111 may occur at a time after the web application is initially loaded, and may occur without establishing an additional network connection. When a new feature is added to the retail web application, executable code for the new feature may be embedded in the resource 117, such as in a comment included in the <SCRIPT> tag 122, or another <SCRIPT> tag. As new features are introduced to the retail web application, startup latency may remain constant or near constant, since the additional executable code does not have to be parsed during the initial loading of the retail web application.

In general, the system 100 provides the additional advantages of 'correctness,' 'laziness,' and 'abstraction.' With regard to correctness, a module loader on the client device 102 may ensure that the non-essential executable code is not loaded before it is needed, to prevent the web application from failing. With regard to laziness, the module loader may not load any of the non-essential code until just before it is needed, to prevent degradation of performance. Code that is associated with features that a user does not select may never be required and may therefore never be loaded. With regard to abstraction, the module loader hides the complexity of loading the code on an as-needed basis from the web application. The code of the web application operates as though the code will always be loaded when required, without having to explicitly specify when to load those modules. Abstraction prevents the code of the web application from quickly becoming complicated and therefore harder to maintain.

Figure 2:
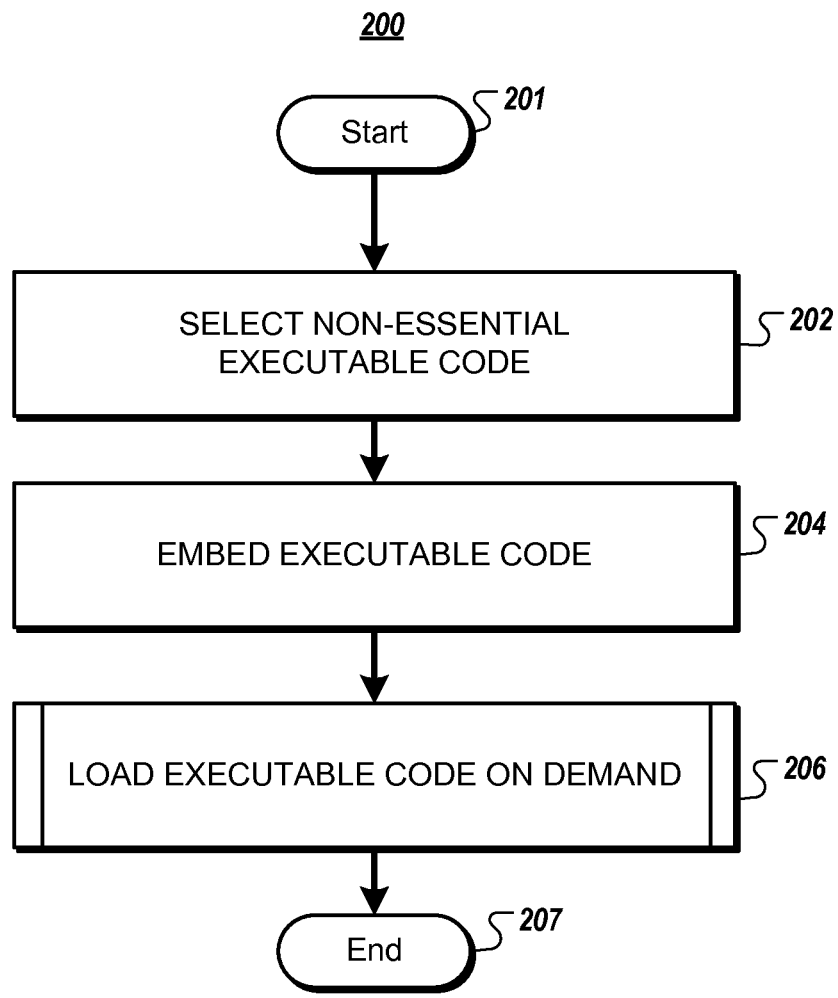
FIGS. 2 and 3 are flowcharts of example processes.

FIG. 2 is a flowchart of an example process 200. Briefly, the process 200 includes the actions of selecting non-essential executable code, embedding executable code, and loading executable code on demand.

In further detail, when the process 200 begins (201), non-essential executable code is selected (202). For example, a mapping may identify that, for a particular resource, certain executable code referenced by the resource is essential, and should (or must) thereby be evaluated when a web application is initially loaded, and other executable code referenced by the resource is non-essential, and may (or must) thereby be evaluated at a time after the web application is initially loaded. For example, a mapping for a particular resource may indicate that, in a particular context, the certain code referenced by the resource should not be evaluated until a button click event, a mouse event, or a timer event has occurred. Mappings may be generated manually or automatically, or no mapping may be used (e.g., if the user manually identifies essential or non-essential code portions).

A particular resource may be associated with a mapping that applies to all users, or the particular resource may be associated with user-specific, user-cluster-specific, or default user mappings. The mappings may be generated based on historical usage data of the user or of other users. For example, if historical usage data for a user indicates that the user frequently uses an application feature that is implemented by particular code, the mapping may indicate that the particular code is to be considered essential code for the user, and should be loaded when the web application is initially loaded.

One or more default mappings may be used, for example using a default mapping for unauthenticated users and a default mapping for authenticated users. A default mapping may be used, for example, if a user-specific mapping for a user is not located. As another example, mappings in a default mapping may be used if there are no corresponding mappings for a particular code module in a user-specific mapping (e.g., a user-specific mapping for a particular code module may override a default mapping).

Mappings may be received from a server and store on the client device. In some implementations, mappings for a resource are received from the server in response to every request for the resource. In other implementations, mappings for a resource are retrieved from a mapping cache. Cached mappings may be updated on a periodic basis (e.g., every day, every three days). Using cached mappings may improve performance, such as in situations where a user frequently (e.g., several times per day) requests the same resource.

Mappings may be generated based on user preferences. For example, a user may configure user preferences to specify that they desire certain features to be loaded when a web application is initially loaded, or that certain features should only be loaded in response to certain events. In the former example, a mapping may be generated to specify that the code associated with the features that the user prefers to be loaded when the web application is initially loaded is to be considered essential code. In the latter example, the mapping may be generated to specify that the code associated with the features that the user prefers to be loaded in response to certain events is to be considered non-essential code.

When generating mappings, stated user preferences may be assigned a higher weighting than historical usage data, or vice versa. For example, if historical usage data indicates that a user frequently uses a particular feature, the resource may nonetheless be loaded in response to a control event if user preferences specify that the code associated with the particular feature is non-essential, and is to be loaded only in response to a control event.

In one particular example of a weather web application, a mapping may establish that code relating to certain high level functionality, such as "weather in my favorite cities" feature, a "view a city's entire week forecast" feature, and a feature which obtains weather data from an external web service, is essential code. The mapping may establish that code relating to other features, such as a weather data model feature, a weather web service API feature, a favorite cities feature, or a city weather forecast feature, are candidates for dynamic evaluation, and may therefore be considered non-essential code.

Executable code is embedded (204) within markup language code. For example, non-essential executable code may be embedded in markup language code of a resource which references the non-essential executable code. In various examples, the executable code may be embedded inside of a <SCRIPT> tag, a <NOSCRIPT> tag, a <STYLE> tag, or a CDATA section.

In some implementations, comments which are included in the executable code are removed before the executable code is embedded. In some implementations, END COMMENT delimiters included in the executable code are replaced with a predefined token which includes one or more characters which do not normally appear in executable code (e.g., an example predefined token is "\b\b").

Executable code is loaded on demand (206), thereby ending the process 200 (207). By loading executable code on demand instead of upon the initial loading of the web application, startup latency may be reduced. Loading the executable code on demand is described in more detail below with respect to FIG. 3.

Figure 3:
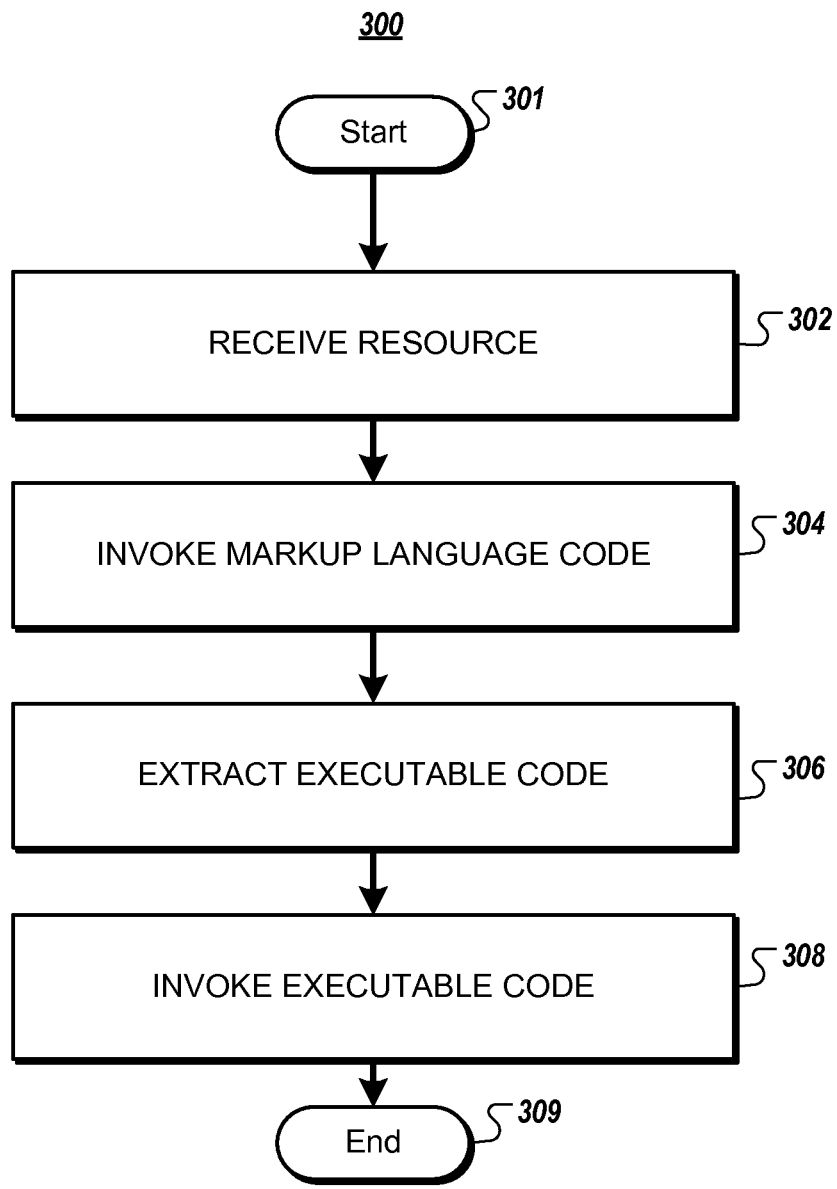

FIG. 3 is a flowchart of an example process 300 for loading executable code on demand. Briefly, the process 300 includes the actions of receiving a resource, invoking markup language code, extracting executable code, and invoking the executable code.

In further detail, when the process 300 begins (301), a resource is received (302), where the resource includes markup language code and executable code embedded (e.g., in a comment) within the markup language code. The resource may be received, for example, by a client device from a server device, in response to a user request to invoke a web application which calls for the resource to be loaded. When the resource is received, parsing of the embedded executable code may be avoided because it is included within a comment of the markup language code.

Markup language code is invoked (304), for example by a web browser. Markup language code included in the received resource may be invoked, which may, for example, result in the display of a user interface on a client device. The executable code that is included within the comment of the markup language code is not parsed or evaluated when the markup language is invoked.

The executable code that is included within the markup language code is extracted, or decommented, from the comment (306), for example from a comment in the markup language code. The executable code may be extracted, for example, based on determining that a DOM event, such as a mouse click event, has occurred.

Extracting the executable code may include removing a BEGIN COMMENT delimiter (e.g., "/*") and an END COMMENT delimiter (e.g., "*/") surrounding the executable code, within the markup language code. In implementations where each END COMMENT delimiter included in the executable code has been replaced by a token, one or more occurrences of the token in the executable code may be replaced by an END COMMENTdelimiter (e.g., "*/").

The executable code is invoked (308), thereby ending the process 300 (309). For example, the extracted executable code may be parsed and invoked using an EVAL( ) function.

In real-world testing, 200 kilobytes of JavaScript code was commented out in markup language code, adding 240 milliseconds to the time that it would have ordinarily taken to load the markup language code. By contrast, however, this same two hundred kilobytes of JavaScript code would have taken 2600 milliseconds to parse, reflecting a 10× increase in startup latency.

Figure 4:
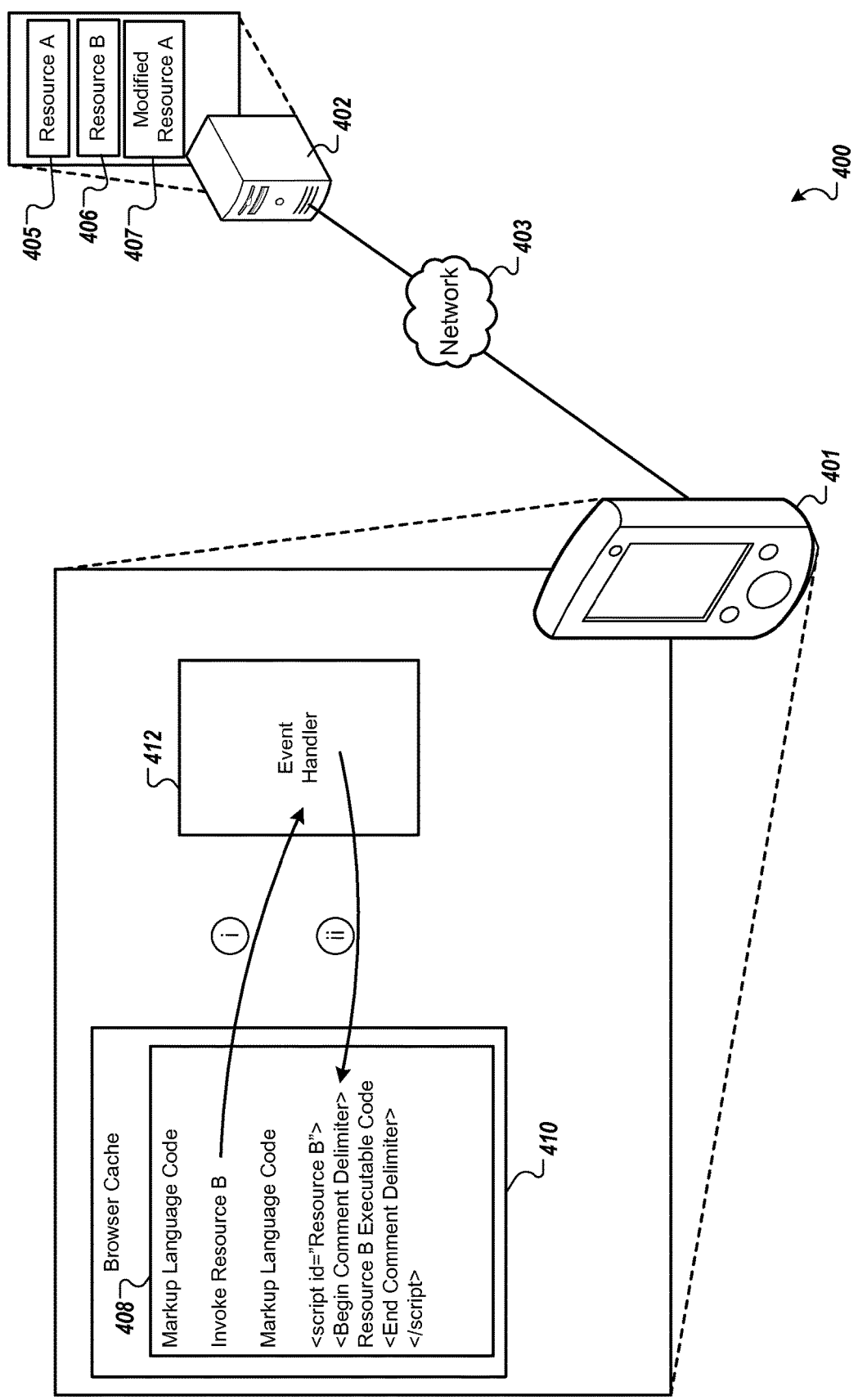

FIG. 4 shows an example system 400 that delays the parsing of non-essential code to reduce startup latency. The example system 400 includes a client device 401 and a server 402, connected by way of a network 403. The server 402 hosts (or otherwise has access to) a markup language resource 405 ("Resource A") associated with a web application, a executable code resource 406 ("Resource B") which is referenced by the resource 405, and a modified version 407 of the markup language 405, which includes the markup language code of the markup language resource 405 and the executable code of the resource 405 included within a comment of the markup language code. The executable code resource 406 may be a module of executable code that is internal to the markup language resource 405.

The user of the client device 401 may enter a command into the client device 401 to invoke a web application that calls for the markup language resource 405 to be loaded. The client device 401 may send a request to the server 402, to request to access the markup language resource 405. In response, the server 402 may transmit a copy 408 of the modified markup language resource 407 to the client device 401. The copy 408 may be stored as in a browser cache 410 included in the client device 401. Subsequent requests for the resource 405 may be serviced from the browser cache 410 rather than from the server 402, for example to reduce the quantity of network connections that must be established to obtain the executable code.

An instance of an event handler 412 is initiated by the client device 401, to re-route external requests for the executable code associated with the executable code resource 406. When an event associated with the event handler 412 is triggered (illustrated as state (i)), the event handler 412 is configured to extract the executable code from the comment embedded in the markup language (illustrated as state (ii)) and to invoke the extracted executable code. The event handler 412 may extract the executable code from the browser cache 410 in response to a request to obtain the executable code from the browser cache 410 (i.e., an internal request), or in response to a request to obtain the executable code from the server 402 over the network 403 (i.e., an external request).

Notably, in either instance, the event handler obtains the executable code from the browser cache 410, without establishing an additional network connection. The event handler 412 may be configured to dynamically load the executable code for the resource 406 synchronously (e.g., rather than receiving the executable code asynchronously over the network 403). Coding the event handler 412 to load the executable code synchronously may result in smaller and faster code as compared to code which asynchronously fetches executable code over the network 403 (e.g., since code for fetching the executable code asynchronously may include more error handling code to handler errors such as network connection errors).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A system comprising:
   one or more computers; and
   a computer-readable medium coupled to the one or more computers having instructions stored thereon which, when executed by the one or more computers, cause the one or more computers to perform operations comprising:
   receiving a request for a resource from a client device, wherein the requested resource includes markup language code and executable code that is capable of being executed by an application at the client device;
   selecting, in response to receiving the request for the resource and from among a plurality of resource mappings that are assigned to respective resources from a plurality of resources, a particular resource mapping that is assigned to the requested resource and that designates:
   (i) a first portion of the executable code of the requested resource as non-essential to an ability of the application at the client device to render a visually complete presentation of the requested resource, and
   (ii) a second portion of the executable code of the requested resource as essential to the ability of the application at the client device to render the visually complete presentation of the requested resource; and
   generating, based on identifying that the particular resource mapping designates the first portion of the executable code as non-essential to the ability of the application at the client device to render the visually complete presentation of the requested resource, a modified version of the requested resource by delimiting the first portion of the executable code or a modified version of the first portion of the executable code, to an exclusion of the second portion of the executable code, within the markup language code of the requested resource in a manner that prevents the first portion of the executable code or the modified version of the first portion of the executable code from being executed when the application at the client device initially loads the modified version of the requested resource; and
   transmitting, to the client device, the modified version of the requested resource.

2. The system of claim 1, wherein the first portion of the executable code of the requested resource comprises a script that is configured to be executed in an interpreted environment at the client device.

3. The system of claim 1, wherein the application at the client device that is capable of executing executable code referenced by of the requested resource is a web browsing application.

4. The system of claim 1, wherein the first portion of the executable code of the requested resource comprises a script that is embedded within the requested resource.

5. The system of claim 1, comprising delimiting the first portion of the executable code or the modified version of the first portion of the executable code by embedding the first portion of the executable code or the modified version of the first portion of the executable code within one or more comments of the markup language code.

6. The system of claim 1, wherein the first portion of the executable code is arranged in the requested resource to be executed by the application at the client device when the application initially loads the requested resource.

7. The system of claim 1, wherein generating the modified version of the requested resource comprises embedding within the markup language code additional executable code that is configured to cause the application at the client device to delay execution of the first portion of the executable code or the modified version of the first portion of the executable code until the application detects an occurrence of a pre-defined event specified by the additional executable code.

8. The system of claim 7, wherein the pre-defined event comprises expiration of a timer or a user selection of a control that has been assigned to the first executable code or the modified version of the first executable code.

9. The system of claim 1, comprising selecting the particular resource mapping, from among the plurality of resource mappings, based on at least one of a time, a date, a location, or a motion associated with the request.

10. The system of claim 1, wherein the requested resource comprises a web page.

11. The system of claim 1, wherein generating the modified version of the requested resource comprises delimiting the first portion of the executable code within the markup language code of the requested resource in the manner that prevents the first portion of the executable code from being executed when the application at the client device initially loads the modified version of the requested resource.

12. The system of claim 1 comprising generating the modified version of the first portion of the executable code by replacing an end-comment delimiter that initially occurs within the first executable code with a different token that the application at the client device is not configured to interpret as an end-comment delimiter.

13. The system of claim 1, wherein:
   the plurality of resource mappings include a first subset of resource mappings, including the particular resource mapping, that are each assigned to the requested resource; and
   at least two resource mappings within the first subset of resource mappings designate different portions of the executable code of the requested resource as non-essential for rendering a visually complete presentation of the requested resource.

14. The system of claim 13, wherein the operations comprise:
   determining an identity of a user of the client device that submitted the request for the resource;
   determining that the particular resource mapping is associated with the user of the client device that submitted the request for the resource; and
   selecting the particular resource mapping from the first subset of resource mappings based on the particular resource mapping being associated with the user of the client device that submitted the request for the resource.

15. The system of claim 13, wherein the operations comprise:
   determining that a user of the client device that submitted the request for the resource belongs to a particular cluster of users of multiple clusters of users;
   determining that the particular resource mapping is associated with the particular cluster of users to which the user of the client device that submitted the request for the resource belongs; and
   selecting the particular resource mapping from the first subset of resource mappings based on the particular resource mapping being associated with the particular cluster of users to which the user of the client device that submitted the request for the resource belongs.

16. The system of claim 13, wherein the operations comprise selecting the particular resource mapping from the first subset of resource mappings based on at least one of a time, a date, a location, or a motion associated with the request for the resource.

17. The system of claim 1, wherein:
   the first portion of the executable code of the requested resource implements a particular feature with which a user can interact in a presentation of the resource; and
   the operations further comprise:
      identifying a historical frequency with which one or more users have interacted with the particular feature in the presentation of the resource; and
      designating the first portion of the executable code of the requested resource as non-essential in the particular resource mapping based on the historical frequency with which the one or more users have interacted with the particular feature implemented by the first portion of the executable code in the presentation of the resource.

18. The system of claim 17, wherein:
   the particular resource mapping is a personal resource mapping for a user of the client device that submitted the request for the resource; and
   the first portion of the executable code of the requested resource is designated as non-essential in the particular resource mapping based on the historical frequency with which the user of the client device that submitted the request for the resource has interacted with the particular feature implemented by the first portion of the executable code in the presentation of the resource.

19. A computer-implemented method, comprising:
   receiving, by a computing system, a request for a resource from a client device, wherein the requested resource includes markup language code and executable code that is capable of being executed by an application at the client device;
   selecting, by the computing system and in response to receiving the request for the resource and from among a plurality of resource mappings that are assigned to respective resources from a plurality of resources, a particular resource mapping that is assigned to the requested resource and that designates:
      (i) a first portion of the executable code of the requested resource as non-essential to an ability of the application at the client device to render a visually complete presentation of the requested resource, and
      (ii) a second portion of the executable code of the requested resource as essential to the ability of the application at the client device to render the visually complete presentation of the requested resource; and
   generating, by the computing system and based on identifying that the particular resource mapping designates the first portion of the executable code as non-essential to the ability of the application at the client device to render the visually complete presentation of the requested resource, a modified version of the requested resource by delimiting the first portion of the executable code or a modified version of the first portion of the executable code, to an exclusion of the second portion of the executable code, within the markup language code of the requested resource in a manner that prevents the first portion of the executable code or the modified version of the first portion of the executable code from being executed when the application at the client device initially loads the modified version of the requested resource; and
   transmitting, from the computing system and to the client device, the modified version of the requested resource.

20. A non-transitory computer-readable medium having instructions stored thereon that, when executed by one or more processors, cause performance of operations comprising:
   receiving, by a computing system, a request for a resource from a client device, wherein the requested resource includes markup language code and executable code that is capable of being executed by an application at the client device;
   selecting, by the computing system and in response to receiving the request for the resource and from among a plurality of resource mappings that are assigned to respective resources from a plurality of resources, a particular resource mapping that is assigned to the requested resource and that designates:
      (i) a first portion of the executable code of the requested resource as non-essential to an ability of the application at the client device to render a visually complete presentation of the requested resource, and
      (ii) a second portion of the executable code of the requested resource as essential to the ability of the application at the client device to render the visually complete presentation of the requested resource; and
   generating, by the computing system and based on identifying that the particular resource mapping designates the first portion of the executable code as non-essential to the ability of the application at the client device to render the visually complete presentation of the requested resource, a modified version of the requested resource by delimiting the first portion of the executable code or a modified version of the first portion of the executable code, to an exclusion of the second portion of the executable code, within the markup language code of the requested resource in a manner that prevents the first portion of the executable code or the modified version of the first portion of the executable code from being executed when the application at the client device initially loads the modified version of the requested resource; and transmitting, from the computing system and to the client device, the modified version of the requested resource.

\* \* \* \* \*